US009264369B2

(12) United States Patent
Menchaca et al.

(10) Patent No.: US 9,264,369 B2
(45) Date of Patent: Feb. 16, 2016

(54) TECHNIQUE FOR MANAGING TRAFFIC AT A ROUTER

(75) Inventors: Ben Menchaca, Pflugerville, TX (US); Wayne Dunlap, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 12/960,935

(22) Filed: Dec. 6, 2010

(65) Prior Publication Data
US 2012/0144063 A1 Jun. 7, 2012

(51) Int. Cl.
*H04L 12/859* (2013.01)
(52) U.S. Cl.
CPC .................................. *H04L 47/2475* (2013.01)
(58) Field of Classification Search
USPC ......................................................... 709/240
See application file for complete search history.

(56) References Cited

U.S. PATENT DOCUMENTS

| | | | |
|---|---|---|---|
| 6,167,445 A * | 12/2000 | Gai et al. ....................... 709/223 |
| 6,718,380 B1 | 4/2004 | Mohaban et al. |
| 7,460,476 B1 * | 12/2008 | Morris et al. .............. 370/230.1 |
| 7,801,973 B1 | 9/2010 | Thakur et al. |
| 8,391,356 B1 * | 3/2013 | Jafari et al. .............. 375/240.01 |
| 2001/0039576 A1 * | 11/2001 | Kanada .......................... 709/223 |
| 2002/0021701 A1 * | 2/2002 | Lavian et al. .................. 370/401 |
| 2005/0058069 A1 | 3/2005 | Dauchy et al. |
| 2008/0281979 A1 | 11/2008 | Keeler |
| 2008/0291916 A1 * | 11/2008 | Xiong et al. ................... 370/392 |
| 2011/0116483 A1 * | 5/2011 | Lee et al. ....................... 370/338 |
| 2011/0305147 A1 * | 12/2011 | Xu et al. ........................ 370/252 |

FOREIGN PATENT DOCUMENTS

| CN | 101438534 | 5/2009 |
|---|---|---|
| JP | 2002016643 | 1/2002 |
| JP | 2003087314 | 3/2003 |
| JP | 2008092184 | 4/2008 |
| JP | 2008205721 | 9/2008 |
| WO | WO2008015379 A1 | 2/2008 |
| WO | WO2010074619 A1 | 7/2010 |
| WO | 2012078575 | 6/2012 |

OTHER PUBLICATIONS

International Search Report and Written Opinion—PCT/US2011/063428—ISA/EPO—Feb. 10, 2012, 14 pages.

(Continued)

*Primary Examiner* — Angela Nguyen
(74) *Attorney, Agent, or Firm* — DeLizio Law, PLLC

(57) ABSTRACT

A router of a network is configured to manage routing of packets based on executing applications. The network communicates packets of information between endpoints coupled to the network. Each packet is assigned to a traffic class based on the application associated with the packet. The router manages routing of received packets based on the traffic classes associated with the received packets. Accordingly, the router can determine routing priority, bandwidth, acknowledgment policy, and other routing management information based on the applications associated with received packets.

30 Claims, 7 Drawing Sheets

(56) References Cited

OTHER PUBLICATIONS

"PCT Application No. PCT/US2011/063428, Written Opinion of the IPEA", Dec. 19, 2012, 6 pages.

International Preliminary Report on Patentability—PCT/US2011/063428, The International Bureau of WIPO—Geneva, Switzerland—Mar. 18, 2013.

"Japanese Patent Application No. 2013-543250, First Office Action", Jul. 1, 2014, 5 pages.

"Korean Patent Application No. 2013-7017558 KIPO Notice of Grounds for Rejection", Jun. 27, 2014, 6 pages.

"Japanese Patent Application No. 2013543250, Office Action", Oct. 28, 2014, 4 pages.

"Chinese Application No. 201180058489.2 First Office Action", Mar. 4, 2015, 19 pages.

* cited by examiner

TECHNIQUE FOR MANAGING TRAFFIC AT A ROUTER

BACKGROUND

1. Field of the Disclosure

The present disclosure relates to computer networks and more particularly to routing devices for a computer network.

2. Description of the Related Art

Communication networks are employed to transfer a wide variety of information between electronic devices. However, as the amount of information transferred over a communication network increases, the communication backbone that governs the network can become stressed, causing undesirable delays in information transfer. This can result in a poor user experience. For example the user can experience network lag, where packets are held at a network node while awaiting transfer to another network node, for an amount of time such that the user is able to perceive the delay in the information transfer. Further, network lag and other network transfer problems can impact a wide variety of applications, such as gaming applications, voice communication applications, and the like.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-7 illustrate techniques for improving communication efficiency of a network by configuring a router of the network to manage packet communication based on the identification of particular applications executing at one or more endpoint devices connected to the router. In particular, the network communicates packets of information between endpoints coupled to the network. The router is employed by the network to route packets between network nodes, and manages communication of the packets according to the traffic class associated with each packet. The router is configured to assign the traffic class for a packet according to the application that provided the packet or the application that is the target of the packet. Accordingly, the traffic class for received packets priority order is dynamically determined based on a determination of which applications are executing at one or more endpoints. The router can therefore manage packet communication more efficiently, depending on the bandwidth, priority, and other communication requirements of the executing applications.

To illustrate, a communication endpoint, such as a computer device, can be executing an online game application and a peer-to-peer (P2P) file communication program. Typically, online game programs have a higher priority than P2P file communication programs for the user. In particular, for an online game program relatively fast communication of information, such as character status updates, to a game server is useful for providing an enjoyable game experience. P2P file communication, in contrast, typically demands a relatively long amount of time, and rapid communication of a particular packet associated with the P2P file communication program does not significantly affect the user experience. Accordingly, the router device described herein can be configured to assign a traffic classes to packets associated with the game program and the P2P file communication program such that the packets associated with the game program are given higher priority for routing. Further, the traffic class assigned to each packet is based on an application associated with the packet, rather than a fixed router port number.

Figure 1:
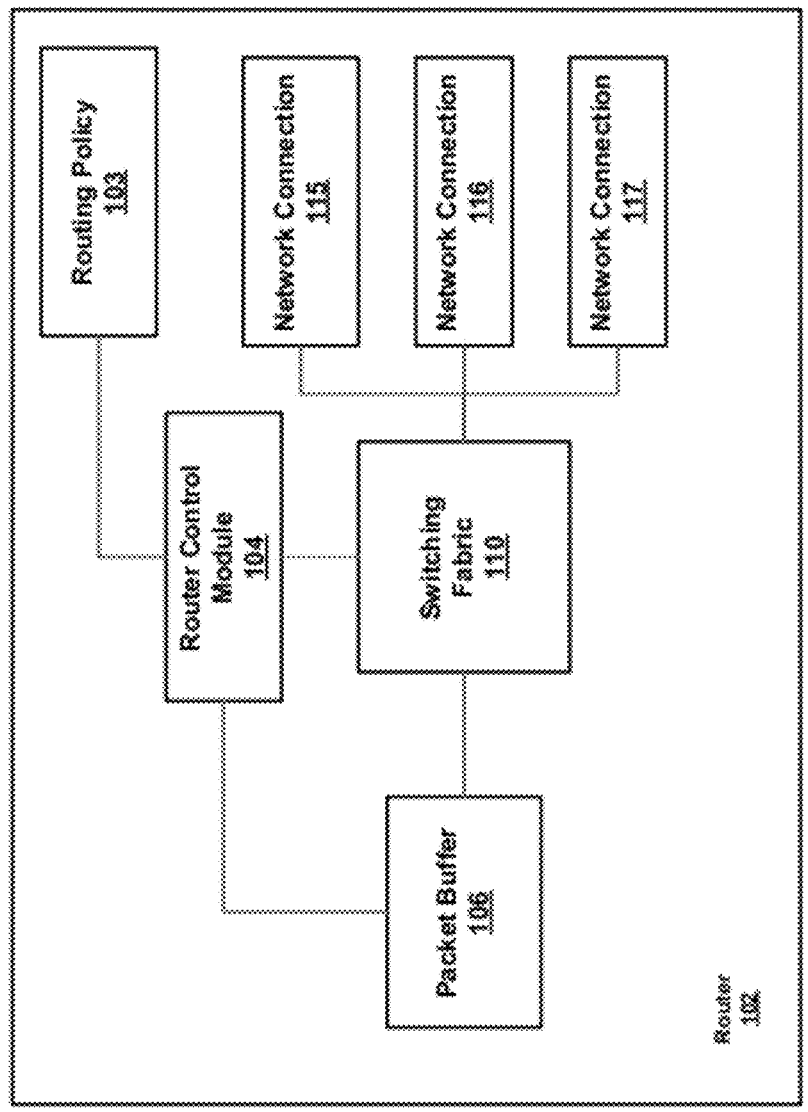
FIG. 1 is a block diagram of a router in accordance with one embodiment of the present disclosure.

Referring to FIG. 1, a block diagram of a router 102 is illustrated. The router 102 is incorporated into a communication system, whereby the router 102 receives and communicates packets to and from a communication network. The communication network includes a number of nodes, whereby a network node is a point at in the network that can provide packets, receive packets, or any combination thereof. Accordingly, nodes can be generally classified as endpoints or routing nodes with respect to a particular communication session. An endpoint refers to either an originating source or end destination of payload information included in a packet. A routing node refers to a node that receives packets from one or more network nodes and provides the packets, based on address information included with each packet, to one or more other network nodes. It will be appreciated that a network node can be a routing node with respect to one packet and an endpoint with respect to another packet. Thus, for example, a server device can originate information for communication to an endpoint, and can also route received packets to other network nodes. The server is therefore an endpoint with respect to the packet that it originated, and a routing node with respect to the packets that it receives from the network for routing to other nodes.

Router 102 is incorporated at a routing node of a network, and includes a number of modules to facilitate receiving and routing of packets to other network nodes. In particular, in the illustrated example of FIG. 1, router 102 includes a router control module 104, a packet buffer 106 a switching fabric 110, and network connections 115-117. Each of the network connections 115-117 is an input/output connection to the network that allows for both receiving packets from and communication of packets to nodes of the network. In particular, each of the network connections 115-117 is connected to a different subset of the nodes included in the network. Accordingly, by receiving a packet at one network connection and transmitting the packet via another network connection, router 100 communicates the packet from one subset of nodes to another.

Switching fabric 110 is a communication backbone that routes packets between modules of the router 102. The switching fabric receives control signaling that indicates which module of the network is to receive a provided packet. Accordingly, switching fabric 110 facilitates reception, storage, and provision of packets by the router 102.

Packet buffer 106 is a memory structure, such as a random access memory (RAM), non-volatile memory, or other memory that stores received packets. Packet buffer 106 can store the packets in individually addressable locations, whereby the packet buffer 106 stores or retrieves packets at the addressable locations based on received control signaling. The control signaling indicates whether an access request to the packet buffer 106 is a read or write access, and indicates the address of the location associated with the access. In response, the packet buffer 106 stores a received packet at the indicated location, in the case of a write access, or retrieves a packet stored at the indicated location, in the case of a read access.

Router control module 104 is a module operable to control the operations of the router 102. Accordingly, router control module 104 can be a general purpose or application specific processor, one or more logic modules to implement a state machine, and the like, or any combination thereof. To control the operations of the router 102, router control module 104 monitors packets received at the router 102, and provides control signaling to facilitate storage and routing of the received packets based on address information associated with each packet.

To illustrate, during operation a packet is received at one of the network connections 115-117. Each received packet is associated with an application. As used herein, an application is associated with a packet if the packet includes payload information provided by the application or is targeted to the application. In response to receiving the packet, router control module 104 provides control signaling to the switching fabric 110 to have the packet provided to the packet buffer 106. Router control module 104 also provides control signaling to the packet buffer 106 so that the received packet is stored at an address indicated by the router control module 104. Router control module 104 can also provide control signaling to retrieve a packet from the packet buffer 106, analyze the destination address information included in the packet, and control the switching fabric 110 so that the packet is provided to the one of the network connections 115-117 indicated by the destination address. In particular, the router control module 104 can access one or more routing tables (not shown) that indicate destination address ranges associated with each subset of network nodes connected to the router 102. Based on the subset of nodes indicated by the address, the router control module can control the switching fabric 110 to provide the packet to the one of the network connections 115-117 associated with the indicated subset of nodes.

The router control module 104 can manage communication of received packets according to a set of traffic classes, whereby each received packet is associated with one of the traffic classes in the set. Management of packets can therefore include prioritization of packet communication based on traffic classes, assigning bandwidth based on traffic classes, managing an acknowledgement policy based on traffic classes, and the like.

To illustrate, the router control module 104 can determine a priority associated with each traffic class, such that packets associated with a higher priority traffic class are more likely to be routed before packets having a lower priority traffic class. In particular, the router control module 104 can retrieve packets from the packet buffer 106 in a priority order, thereby controlling the priority with which each packet is communicated to the network. The priority order for the packets can be based on the priorities associated with the traffic class of each packet. In operation, the router control module 104 retrieves packets from the packet buffer 106 for provision to the network in an order indicated by each packet's priority level. Thus packets with a higher priority level, as indicated by the traffic classes associated with the packets, are communicated to the network before packets with a lower priority level. The router control module 104 can enforce the retrieval of packets from the packet buffer 106 in the priority order in any of a number of ways. In one embodiment, prior to retrieving a packet, the router control module 104 can traverse the packet buffer 106 to determine which of the packets stored at the buffer has the highest priority level. In another embodiment, the packet buffer 106 can be organized into regions, such that packets having a higher priority level are stored in a region different region than packets having a lower priority level. The router control module 104 can retrieve packets for communication in a region order, so that packets from the higher priority region are retrieved from the packet buffer prior to packets stored in the lower priority region.

In an embodiment, the router control module 104 manages the bandwidth and latency for a set of packets based on the traffic classes associated with the packets. For example, a traffic class can indicate both a latency priority level and a bandwidth limit for packets associated with the traffic class. The router control module 104 can periodically retrieve packets associated with a designated traffic class from the packet buffer 106 based on the latency priority order associated with the traffic class, up to a corresponding bandwidth limit associated with the traffic class. By repeating the periodic retrieval of packets based on the traffic classes of packets stored in the packet buffer 106, the bandwidth and latency associated with each traffic class is maintained.

Further, the router control module 104 can manage an acknowledgment policy for packets stored in the packet buffer 106 according to the traffic classes associated with the packets. To illustrate, a first traffic class, designated CLASS1, can be associated with a first acknowledgment policy, whereby the router control module 104, after transmitting a packet associated with CLASS1, resends the packet if an acknowledgement is not received in a designated period of time. A second traffic class, designated CLASS2, can be associated with a second acknowledgment policy, whereby the router control module discards a packet associated with CLASS2 after transmitting, without waiting for an acknowledgement.

In the illustrated embodiment, the router 102 stores a routing policy 103 which includes a table or other data structure that indicates the traffic classes associated with a set of applications executing at one or more endpoints that communicates (transmits or receives) packets via the router 102. The routing policy 103 can also indicate other information, such as the relative priority, bandwidth, acknowledgment policy, and other information associated with each traffic class. The router control module 104 is configured to access the routing policy 103 in order to manage communication of packets according to the traffic classes associated with the packets, as described above. Accordingly, upon receiving a packet at the router 102, the router control module 104 can determine the application associated with the packet. The application associated with the packet can be determined by the router control module 104 based on the router port number that received the packet, header information included in the packet, such as an application name, port number, address, or other information, or any combination thereof. In an embodiment, the router control module 104 can determine the application associated with the packet by inspecting a data payload of the packet or based on a combination of information in the header and information in the data payload. Accordingly, the router control module 104 can determine the application associated with the packet based on information other than the port number that received the packet, or based on both the port number and other information. In another embodiment, the router control module 104 can determine the application associated with the packets based on characteristics of the packets and their communication, such as the size of the packets, the frequency with which the packets are communicated to the router 102, and the like. In other embodiments, the router control module 104 can determine the application associated with the packets based on information received from an external source, such as the application that communicated the packets, a remote server, an external computer device different from the one that communicated the packets, and the like.

Upon determining the application associated with a received packet, the router control module 104 accesses the routing policy 103 to determine the traffic class associated with the application and assigns the indicated traffic class to the packet. In an embodiment, the router control module 104 can assign the traffic class by modifying a header of the packet to indicate the traffic class. In another embodiment, the router control module 104 can store the traffic class for the received packet in a separate database.

In another embodiment, the routing policy 103 indicates a set of application types and a traffic class associated with each type. For example, the routing policy 103 can indicate that a game application is associated with a relatively high priority traffic class while a P2P file communication application is associated with a relatively low priority traffic class. In this embodiment, router control module 104 can receive information, such as from a communication endpoint, indicating the type of application associated with each received packet, and determine the traffic class of received packets according to the application type associated with each packet. The routing policy 103 can be updated over time to reflect the traffic class associated with each application or application type as the traffic class associated with an application or application type changes.

In some embodiments, an application can communicate different types of information, such that different packets communicated to or from the application are associated with different traffic classes. For example, one application can receive a patch update via one set of packets while communicating game session information to a server via a different set of packets. Accordingly, routing policy 103 can indicate the different traffic classes for different types of information communicated by a single application. For example, routing policy 103 can indicate that packets that communicate patch information for the application are associated with a first traffic class, while packets that communicate information representing interactions of a game session are associated with a different traffic class. Router control module 104 can determine the type of information communicated by each packet communicated to or from the application, and assign the traffic class to each packet as indicated by the routing policy 103. The type of information associated with a packet can be determined based on the router port number that received the packet, header information included in the packet, such as an application name, port number, address, or other information, or any combination thereof. In an embodiment, the router control module 104 can determine the type of information associated with the packet by inspecting a data payload of the packet or based on a combination of information in the header and information in the data payload. Accordingly, the router control module 104 can determine the type of information associated with the packet based on information other than the port number that received the packet, or based on both the port number and other information.

Routing policy 103 can be provided to router 102 via the network or other communication path by a communication endpoint or other control device. Thus, for example, a communication endpoint can provide the routing policy 103 to the router 102 to indicate the traffic class or traffic classes for each application. This can be useful, for example, if the router 102 provides the primary interface to the network for the endpoint. In another embodiment, the routing policy 103 can be provided by a device other than the source or destination endpoint. For example, a server can provide the routing policy 103 to the router 102 to set the traffic classes for multiple endpoints, such as for multiple computer devices connected to a common local area network (LAN). In still another embodiment, the routing policy 103 can be preconfigured at the router 102 prior to sale to an end user. In another embodiment, each application can provide the traffic class or traffic classes for packets communicated by the application to the router 102. In still another embodiment, the router 102 can, in response to receiving a packet from or targeted to an application, query the application to provide information indicating its traffic class or traffic classes.

Figure 2:
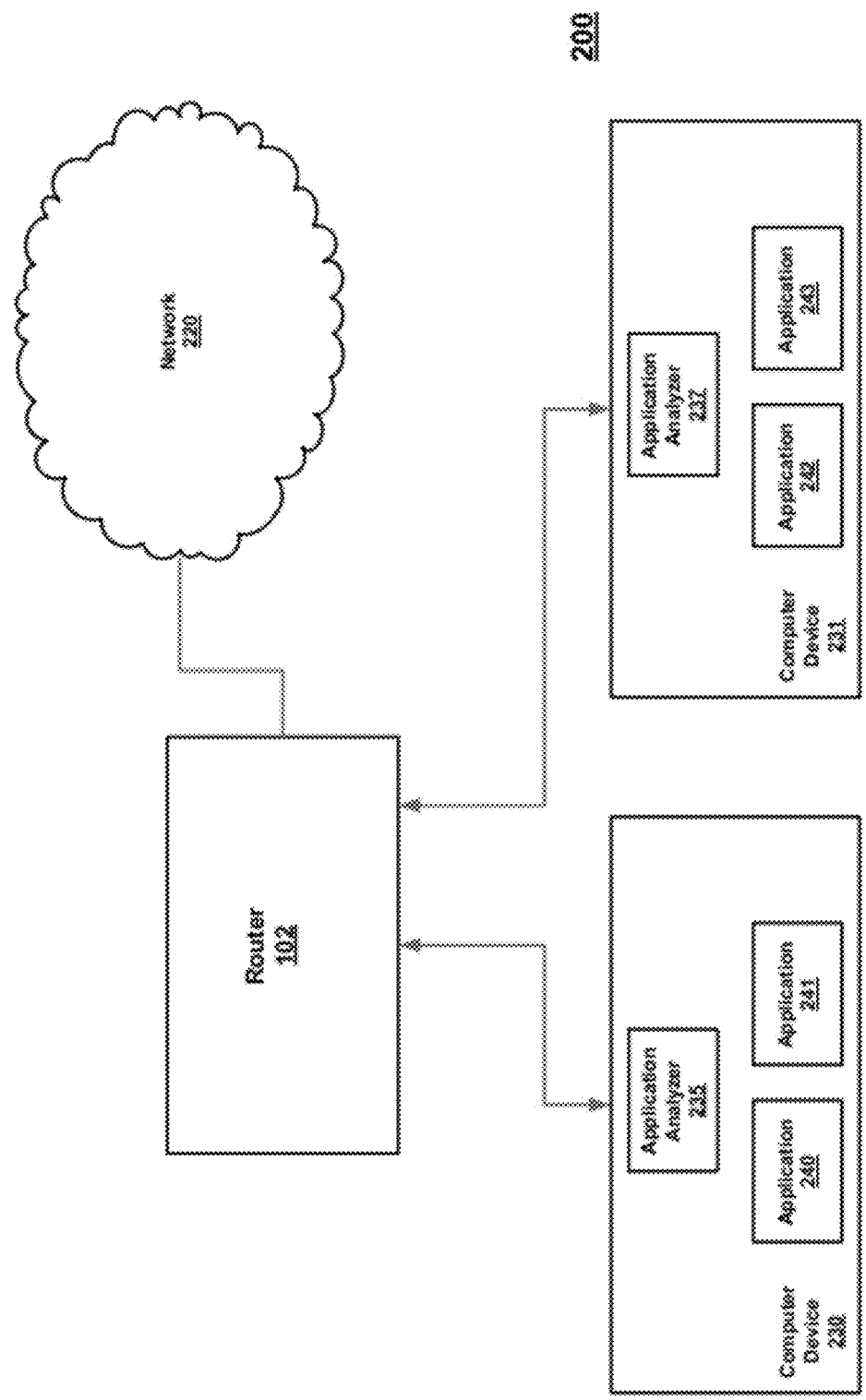
FIG. 2 is a block diagram of a communication system in accordance with one embodiment of the present disclosure.

FIG. 2 illustrates a communication system 200 incorporating the router 102 of FIG. 1 in accordance with one embodiment of the present disclosure. The communication system 200 also includes network 220 and computer devices 230 and 231, each connected to the router 202. In the illustrated embodiment, the router 102 routes packets between the computer devices 230 and 231, and between the computer devices 230 and 231 and the network 220. Each of the computer devices 230 and 231 executes applications. For example, computer device 230 executes applications 240 and 241, while computer device 231 executes applications 242 and 243.

Computer device 230 also executes an application analyzer 235 that is operable to determine the applications that are executing at the computer device 230. The application analyzer 235 can determine the executing applications by accessing process information, task information, or other information provided by an operating system executing at the computer device 230. The application analyzer 235 can also determine the applications that are executing based on what software libraries, device drivers, operating system resources, or other routines, programs, and resources, that are being accessed by each application. Thus, for example, if the application analyzer determines that a video device driver is being accessed at a particular rate, that a video streaming application is being executed. Based on the applications being executed, the application analyzer 235 can set or modify the traffic class information stored at the routing policy 103 of the router 102, thereby setting or modifying the traffic classes associated with packets communicated to the network 220, the computer device 230, or the computer device 231.

In an embodiment, the application analyzer 235 can set the routing policy 103 to set different traffic classes for packets communicated from and to a particular application. Thus, for example, the application analyzer 235 can set a relatively high priority traffic class for packets communicated to application 240 and a relatively low priority traffic class for the packets communicated from the application 240. Accordingly, the router 202 will communicate packets targeted to the application 240 with a higher priority than it will communicate packets provided from application 240. Further, the application analyzer 235 can, for example, set the traffic classes for the applications 240 and 241 such that packets targeted to application 240 have a higher priority than packets targeted to application 241, while packets provided by application 240 have a lower priority than packets provided by application 241. The router 202 thus can manage the upstream (packets provided by the applications 240 and 241) and downstream (packets provided to the applications 240 and 241) communication of packets individually based on different traffic classes for upstream and downstream packet traffic.

Computer device 231 executes application analyzer 237 which performs similar functions as application analyzer 235. In an embodiment, an application analyzer executing at one computer device can set the traffic classes for applications executing at a different computer device. The application analyzer can provide authentication information, such as a password or security code, to the router 102 which authenticates the analyzer based on the authentication information. Based on the authentication, the router 102 can permit or deny the application analyzer from setting the traffic classes for applications executing at a different computer device.

Figure 3:
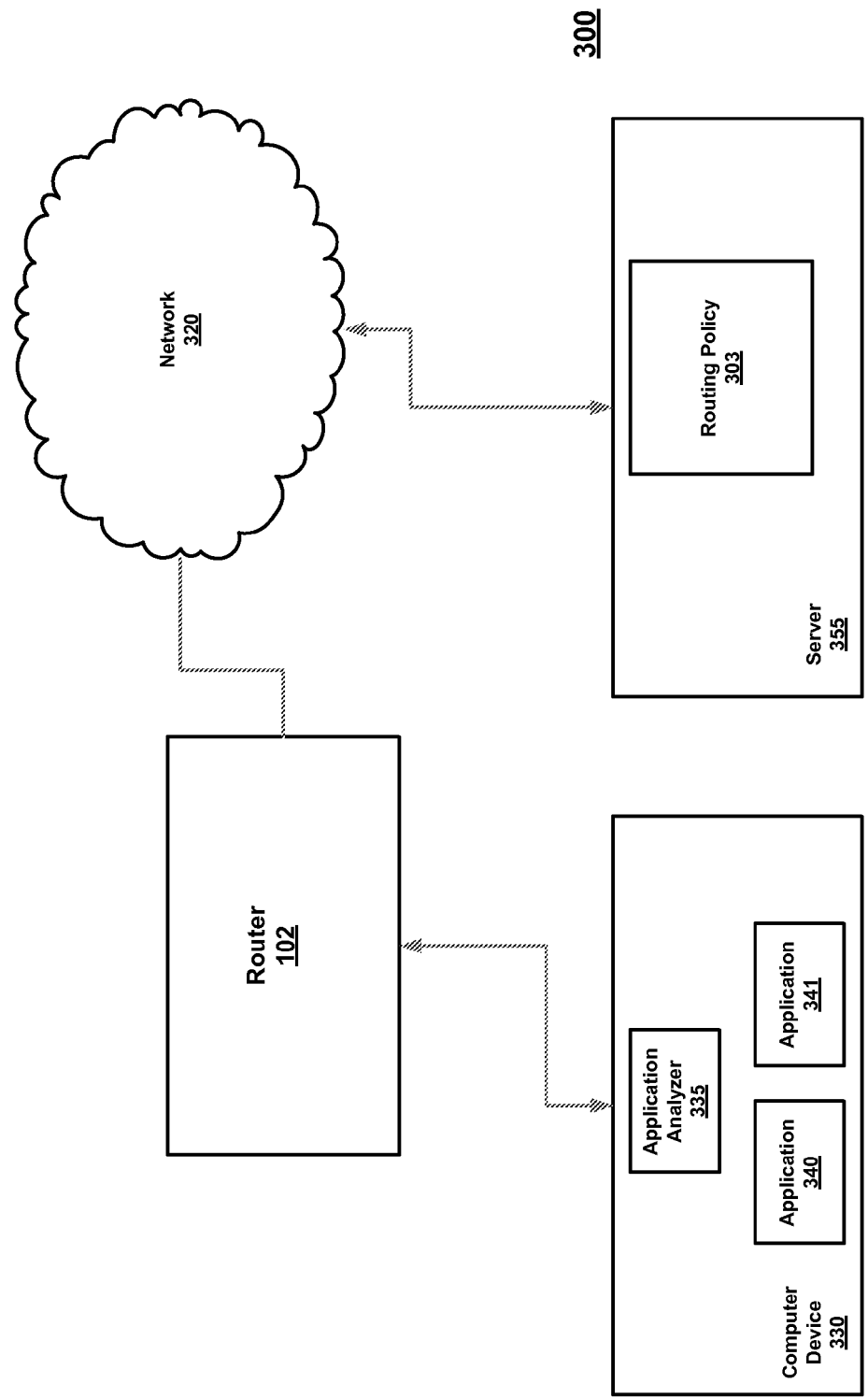
FIG. 3 is a block diagram of another communication system in accordance with one embodiment of the present disclosure.

FIG. 3 illustrates a communication system 300 incorporating the router 102 of FIG. 1 in accordance with another embodiment of the present disclosure. The communication system 300 also includes network 320, computer device 330 connected to the router 102, and a server 355. In the illustrated embodiment, the router 102 routes packets between the computer devices 330 and the network 320. The computer device 330 executes applications 340 and 341. Server 355 stores port priority policy 303.

In operation, the communication system 300 is configured similarly to communication system 200 of FIG. 2. Accordingly, router 102 manages routing of packets to and from the applications 340 and 341 based on the traffic classes associated with each application and the routing policy 303. In the illustrated embodiment, the port routing policy 103 is stored at the server 355. Accordingly, when the router 102 receives packets from or targeted to an application having an unknown traffic class, router 102 can query the server 355 to provide the traffic class or traffic classes for the application as indicated by the routing policy 303. By storing the routing policy 303 at the server 355, the policy can be more easily updated and modified. Further, the routing policy 303 can be used to provide traffic class information to multiple other routers configured similarly to router 102.

Figure 4:
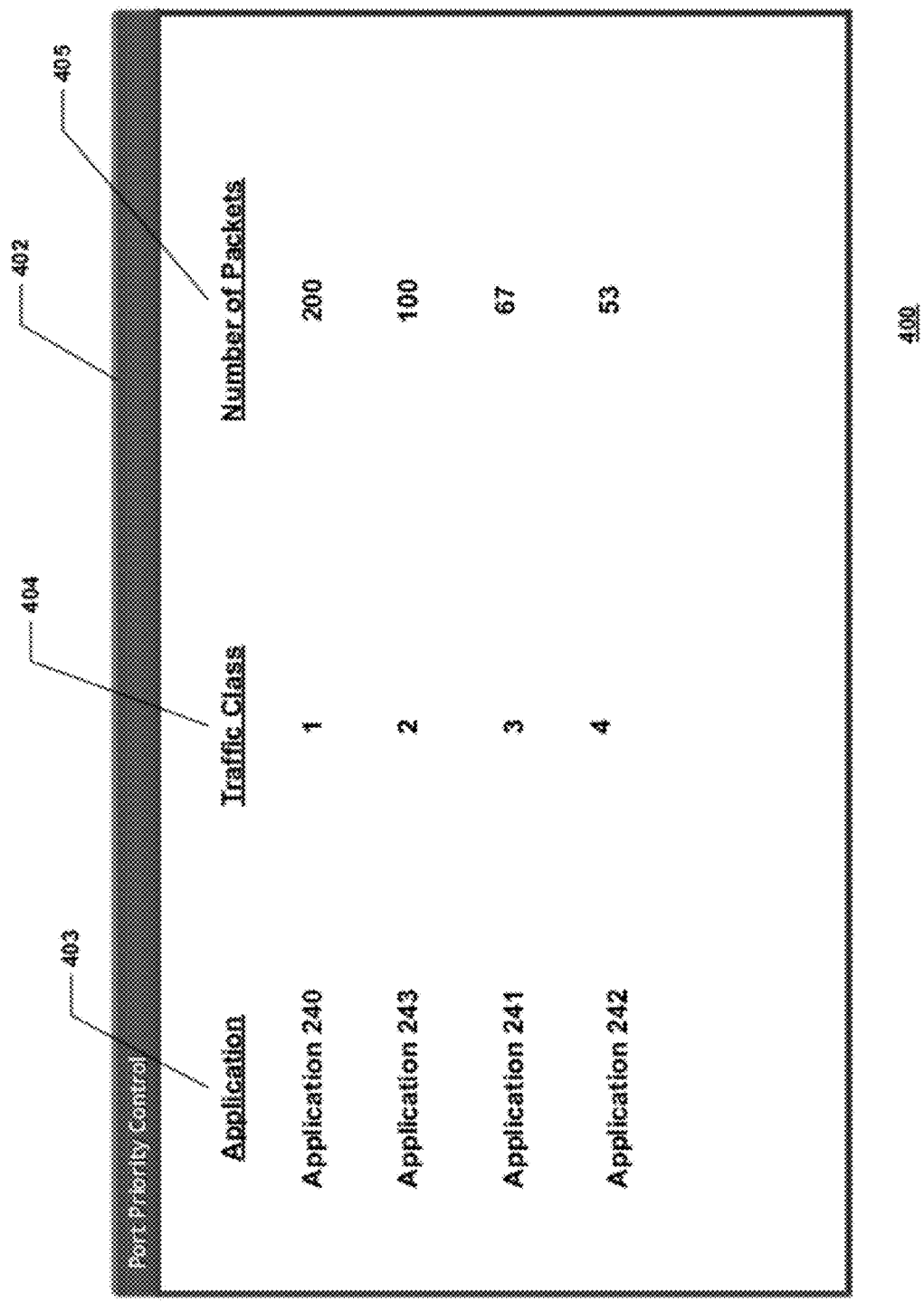
FIG. 4 is a diagram of a graphical user interface in accordance with one embodiment of the present disclosure.

FIG. 4 illustrates a graphical user interface (GUI) 400 in accordance with one embodiment of the present disclosure. GUI 400 allows for display and modification of routing policy 103 via the illustrated traffic class control window 402. Traffic class control window 402 displays a column 403, indicating an application identifier, a traffic class column 404, indicating a traffic class of the associated application, and a number of packets column 405, indicating the number of packets communicated for the associated application by the router 102.

Traffic class control window 402 allows a user to modify the routing policy 103 by setting the traffic class for each application. In one embodiment, the text of priority column 404 can be edited by the user to change the traffic class. For example, the user could enter the number "2" for Application 241. The GUI 400 can automatically reorganize the display of the applications in application column 403 to reflect the adjusted traffic class. Further, GUI 400 will communicate a change in traffic class to router 102, which will update the routing policy 103. In another embodiment, the user can change the traffic class of the applications via dragging the application identifiers in column 403, using a computer mouse or other input device. In another embodiment, the GUI 400 can allow the user to set different traffic classes for different types of information being communicated by a single application. In still another embodiment, GUI 400 can provide an interface for the user to modify the management characteristics for a particular traffic class. Thus, the user could set the priority, bandwidth, acknowledgement policy, and other criteria associated with each traffic class. Further, it will be appreciated that different applications can be associated with the same traffic class via GUI 400.

Figure 5:
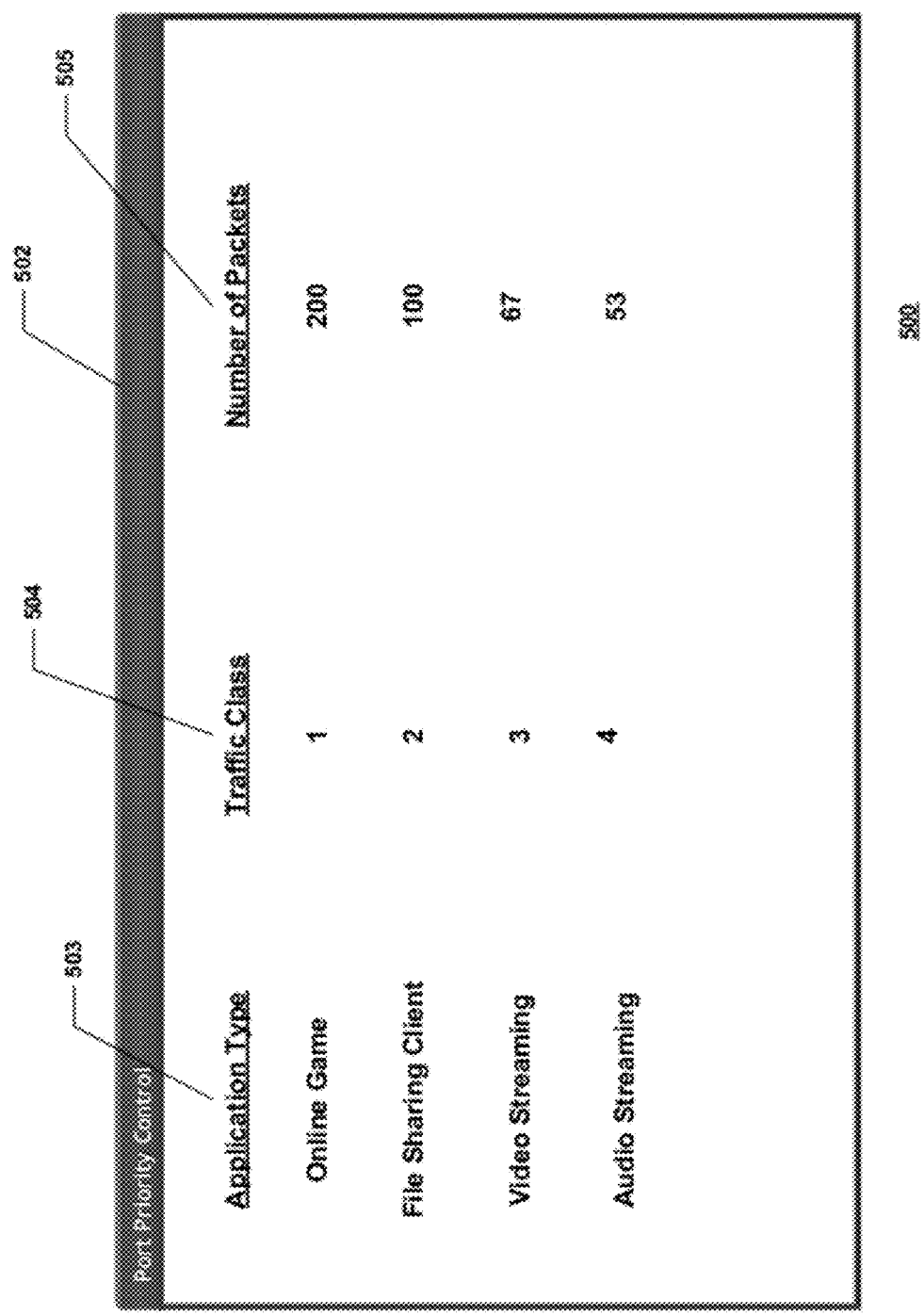
FIG. 5 is a diagram of a graphical user interface in accordance with another embodiment of the present disclosure.

FIG. 5 illustrates a graphical user interface (GUI) 500 in accordance with another embodiment of the present disclosure. GUI 500 allows for display and modification of routing policy 103 via the illustrated traffic class control window 502. Traffic class control window 502 differs from traffic class control window 402 of FIG. 4, in that traffic class control window 502 allows modification of the traffic class based on application type. Accordingly, traffic class control window 502 displays a column 503, indicating an application type identifier, a traffic class column 504, indicating a traffic class of the associated application type, and a number of packets column 505, indicating the number of packets communicated for the associated application type by the router 102. Traffic class control window 502 allows the user to modify the routing policy 103 by changing the traffic class for each application type, via text entry, dragging of type names, or other interface arrangement. GUI 500 communicates any changes in traffic class to router 102, which in response updates the routing policy 103.

Figure 6:
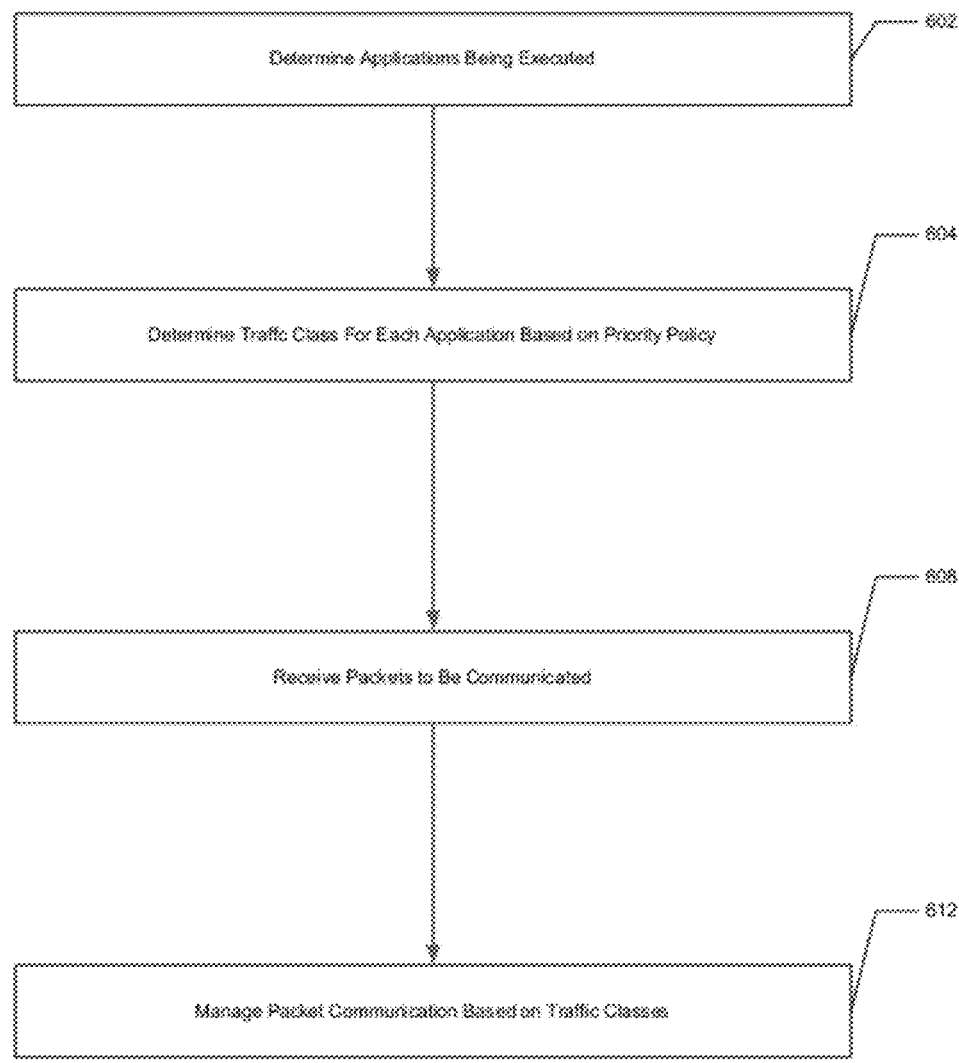
FIG. 6 is a flow diagram of a method of prioritizing routing of packets at a router in accordance with one embodiment of the present disclosure.

FIG. 6 illustrates, in accordance with one embodiment of the present disclosure, a flow diagram of a method of prioritizing ports at router 102 based on applications executing at one or more remote computer devices. At block 602, the router 102 determines the applications being executed at the remote computer devices. In an embodiment, this determination is made by receiving information from each remote computer device indicating the applications, or application types, being executed at the corresponding device. In another embodiment, this determination is made by the router control module 104 analyzing one or more received packets, and determining the application or application type based on the analysis. The router control module 104 thus determines the application or application type associated with a packet based on information other than the number of the port that received or communicated the packet. That is, the determination can be based only on information other than the port number or based both on the port number and information other than the port number. At block 604, the router 102 accesses the routing policy 103 to determine the traffic class for each application being executed. At block 608, the router 102 receives packets to be communicated from the applications executing at the remote computer devices, and stores the packets at packet buffer 106. At block 612, the router 102 manages communication of the packets to the network based on the traffic class associated with each packet.

Figure 7:
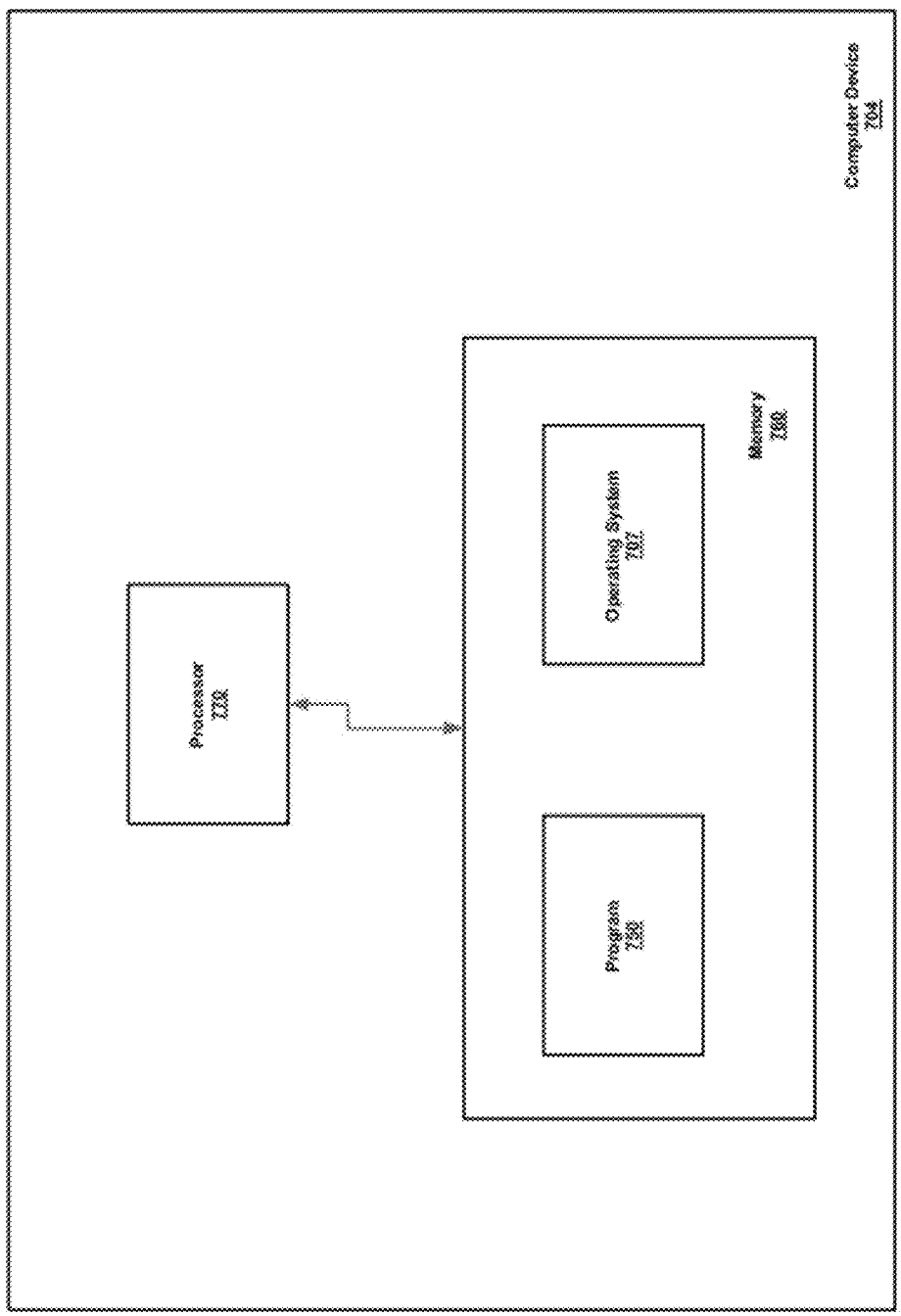
FIG. 7 is a block diagram of a computer device in accordance with one embodiment of the present disclosure

Referring to FIG. 7, a block diagram of a particular embodiment of a computer device 704 is illustrated. The computer device 704 includes a processor 770 and a memory 760. The memory 760 is accessible to the processor 770. The processor 770 can be a microprocessor, microcontroller, and the like. The memory 760 is a computer readable medium that can be volatile memory, such as random access memory (RAM), or non-volatile memory, such as a hard disk or flash memory.

The memory 760 stores a program 750 and an operating system 707. The program 750 and the operating system 707 include instructions to manipulate the processor 770 in order to implement one or more of the methods described herein. Other programs, such as applications, can also be stored in the memory 760 to manipulate the processor in order to implement the described methods.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method performed by a router, the method comprising:
receiving, at the router, a first plurality of packets associated with a first application executing at a first remote device;
determining the first application and a first type of information communicated via the first plurality of packets;
receiving traffic class information from an application analyzer running on the first remote device, wherein the traffic class information indicates one or more traffic classes for at least the first application executing at the first remote device;
assigning a first traffic class to the first plurality of packets based, at least in part, on the first type of information and the first application, said assigning in accordance with the traffic class information; and
managing routing of the first plurality of packets at the router based, at least in part, on the first traffic class.

2. The method of claim 1, wherein said managing routing of the first plurality of packets comprises prioritizing routing of the first plurality of packets based, at least in part, on the first traffic class.

3. The method of claim 1, wherein said managing routing of the first plurality of packets comprises allocating bandwidth of the router to the first plurality of packets based, at least in part, on the first traffic class.

4. The method of claim 1, wherein said determining the first application comprises determining an application type associated with the first plurality of packets.

5. The method of claim 1, wherein said managing routing of the first plurality of packets comprises managing acknowledgement of the first plurality of packets based, at least in part, on the first traffic class.

6. The method of claim 1, wherein said determining the first type of information comprises determining the first type of information based, at least in part, on header information included in the first plurality of packets.

7. The method of claim 1, wherein said determining the first type of information comprises determining the first type of information based, at least in part, on information other than a port number associated with the first plurality of packets.

8. The method of claim 1, wherein said determining the first type of information comprises determining the first type of information based, at least in part, on payload information included in the first plurality of packets.

9. The method of claim 1, further comprising:
receiving, at the router, a second plurality of packets associated with the first application;
determining, at the router, a second type of information communicated via the second plurality of packets;
assigning a second traffic class to the second plurality of packets based, at least in part, on the second type of information and the first application, in accordance with the traffic class information; and
managing routing of the second plurality of packets at the router based, at least in part, on the second traffic class.

10. The method of claim 1, wherein said determining the first application comprises determining an application type associated with the first application.

11. The method of claim 1, wherein said assigning the first traffic class to the first plurality of packets comprises modifying a header of each packet of the first plurality of packets to indicate the first traffic class.

12. The method of claim 1, wherein the traffic class information from the application analyzer is based, at least in part, on operating system information of an operating system executing at the first remote device, the operating system information including at least one of a group consisting of process information and task information.

13. The method of claim 1, wherein the traffic class information from the application analyzer is based, at least in part, on the first application accessing at least one of a group consisting of a software library, a device driver, another application, and a system resource.

14. The method of claim 9, wherein said determining the second type of information comprises determining the second type of information based, at least in part, on header information included in the second plurality of packets.

15. The method of claim 9, wherein said determining the second type of information comprises determining the second type of information based, at least in part, on payload information included in the second plurality of packets.

16. A router, comprising:
a network interface to receive a first plurality of packets; and
a router control module configured to:
determine a first application and a first type of information communicated via the first plurality of packets, after receipt of the first plurality of packets, wherein the first plurality of packets are associated with the first application configured to execute at a first remote device,
receive traffic class information from an application analyzer configured to run on the first remote device, wherein the traffic class information indicates one or more traffic classes for at least the first application,
assign a first traffic class to the first plurality of packets based, at least in part, on the traffic class information, the first type of information, and the first application, and
manage routing of the first plurality of packets at the router based, at least in part, on the first traffic class.

17. The router of claim 16, wherein the router control module is configured to manage routing of the first plurality of packets by prioritizing routing of the first plurality of packets based, at least in part, on the first traffic class.

18. The router of claim 16, wherein the router control module is configured to manage routing of the first plurality of packets by allocating bandwidth of the router to the first plurality of packets based, at least in part, on the first traffic class.

19. The router of claim 16, further comprising:
a packet buffer configured to store packets, and
wherein the router control module is configured to retrieve packets from the packet buffer in an order based, at least in part, on the first traffic class.

20. The router of claim 16, wherein the router control module is configured to determine the first application based, at least in part, on an application type associated with the first plurality of packets.

21. The router of claim 16, wherein the router control module is configured to determine the first type of information based, at least in part, on payload information included in the first plurality of packets.

22. The router of claim 21, wherein the router control module is configured to:
determine a second type of information communicated via a second plurality of packets received at the router, the second plurality of packets associated with the first application;

assign a second traffic class to the second plurality of packets based, at least in part, on the traffic class information, the first application, and the second type of information; and manage routing of the second plurality of packets at the router based, at least in part, on the second traffic class.

23. A non-transitory computer readable medium having instructions stored therein which, when executed by one or more processors, cause the router to:

determine a first application and a first type of information communicated via a first plurality of packets, after receipt of the first plurality of packets, wherein the first plurality of packets are associated with the first application configured to execute at a first remote device;

receive traffic class information from an application analyzer configured to run on the first remote device, wherein the traffic class information indicates one or more traffic classes for at least the first application;

assign a first traffic class to the first plurality of packets based, at least in part, on the first type of information and the first application, in accordance with the traffic class information; and manage routing of the first plurality of packets at the router based, at least in part, on the first traffic class.

24. The non-transitory computer readable medium of claim 23, wherein the instructions which, when executed by the one or more processors, cause the router to prioritize routing of the first plurality of packets based, at least in part, on the first traffic class.

25. The non-transitory computer readable medium of claim 23, wherein the instructions which, when executed by the one or more processers, cause the router to allocate bandwidth of the router to the first plurality of packets based, at least in part, on the first traffic class.

26. The non-transitory computer readable medium of claim 23, wherein the instructions that cause the router to determine the first application comprise instructions which, when executed by the one or more processors, cause the router to determine the first application based, at least in part, on an application type associated with the first plurality of packets.

27. The non-transitory computer readable medium of claim 23, wherein the instructions that cause the router to manage routing comprise instructions which, when executed by the one or more processors, cause the router to manage acknowledgement of the first plurality of packets based, at least in part, on the first traffic class.

28. The non-transitory computer readable medium of claim 23, wherein the instructions that cause the router to determine the first type of information comprises instructions which, when executed by the one or more processors, cause the router to determine the first type of information based, at least in part, on header information included in the first plurality of packets.

29. The non-transitory computer readable medium of claim 23, wherein the instructions that cause the router to determine the first type of information comprises instructions which, when executed by the one or more processors, cause the router to determine the first type of information based, at least in part, on information other than a port number associated with the first plurality of packets.

30. The non-transitory computer readable medium of claim 23, having further instructions which, when executed by the one or more processors, cause the router to:

determine a second type of information communicated via a second plurality of packets associated with the first application;

assign a second traffic class to the second plurality of packets based, at least in part, on the traffic class information, the first application, and the second type of information; and manage routing of the second plurality of packets at the router based, at least in part, on the second traffic class.

\* \* \* \* \*